US 7,659,347 B2

(12) United States Patent
Washino et al.

(10) Patent No.: US 7,659,347 B2
(45) Date of Patent: Feb. 9, 2010

(54) FLUORINE-CONTAINING ELASTOMER COMPOSITION AND MOLDED ARTICLE COMPRISING THE SAME

(75) Inventors: Keiko Washino, Settsu (JP); Kazuyoshi Kawasaki, Settsu (JP); Mitsuru Kishine, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 97 days.

(21) Appl. No.: 11/587,573

(22) PCT Filed: Apr. 22, 2005

(86) PCT No.: PCT/JP2005/007688

§ 371 (c)(1),
(2), (4) Date: Oct. 25, 2006

(87) PCT Pub. No.: WO2005/105917

PCT Pub. Date: Nov. 10, 2005

(65) Prior Publication Data

US 2007/0219332 A1    Sep. 20, 2007

(30) Foreign Application Priority Data

Apr. 28, 2004  (JP)  .............................. 2004-134170
Dec. 22, 2004  (JP)  .............................. 2004-371394

(51) Int. Cl.
  *C08F 8/30*  (2006.01)
(52) U.S. Cl. .................... 525/326.3; 525/351; 525/379; 525/380; 525/381; 525/382
(58) Field of Classification Search ............. 525/326.3, 525/351, 379, 380, 381, 382
See application file for complete search history.

(56) References Cited

U.S. PATENT DOCUMENTS 6,602,961 B1 * 8/2003 Saito et al. ............... 525/326.2
7,309,743 B2 * 12/2007 Kawasaki et al. ......... 525/326.2
2003/0125463 A1 * 7/2003 Tatsu et al. ................ 525/101
2004/0122182 A1   6/2004 Kawasaki et al.

FOREIGN PATENT DOCUMENTS

| EP | 0705873 A | 4/1996 |
| EP | 0708139 A | 4/1996 |
| EP | 0905177 A | 3/1999 |
| EP | 1153976 A | 11/2001 |
| EP | 1 197 517 A1 | 4/2002 |
| EP | 1 243 601 A1 | 9/2002 |
| EP | 1400563 A | 3/2004 |
| EP | 1832608 A | 9/2007 |
| JP | 2003-231719 A | 8/2003 |
| WO | 9823653 A | 6/1998 |
| WO | WO 00/29479 A1 | 5/2000 |
| WO | WO 00/42100 A1 | 7/2000 |
| WO | WO 01/34666 A1 | 5/2001 |
| WO | 02060969 A | 8/2002 |
| WO | 2005049712 A | 6/2005 |

* cited by examiner

*Primary Examiner*—Bernard Lipman
(74) *Attorney, Agent, or Firm*—Sughrue Mion PLLC

(57) ABSTRACT

The present invention provides a fluorine-containing elastomer composition excellent in heat resistance, comprising a fluorine-containing elastomer containing a vinylidene fluoride unit, which is capable of a crosslinking reaction, and a crosslinking agent. The present invention also provides a molded article, a sealing material, and a sealing material for an oxygen sensor excellent in heat resistance, which comprises the composition. The present invention is a fluorine-containing elastomer composition comprising (A) at least one compound selected form the group consisting of a compound containing at least two crosslinking reaction group s represented by the general formula (1), a compound represented by the general formula (2), a compound represented by the general formula (3) and a compound represented by the general formula (4); and (B) a fluorine-containing elastomer capable of a crosslinking reaction with the compound (A), comprising a vinylidene fluoride unit.

11 Claims, No Drawings

FLUORINE-CONTAINING ELASTOMER COMPOSITION AND MOLDED ARTICLE COMPRISING THE SAME

TECHNICAL FIELD

The present invention relates to a fluorine-containing elastomer composition comprising a fluorine-containing elastomer containing a vinylidene fluoride unit, which is capable of a crosslinking reaction, and a compound containing at least two crosslinking reaction groups. Also, the present invention relates to a molded article and a sealing material for an oxygen sensor obtained by crosslinking the fluorine-containing elastomer composition.

BACKGROUND ART

Among fluorine-containing elastomers, a fluorine-containing elastomer containing a vinylidene fluoride unit (VdF) has been widely used because of its excellent heat resistance, chemical resistance, solvent resistance and fuel oil resistance in the fields such as automobile industry, semiconductor industry and chemical industry by forming into shapes such as O-rings, hoses, stem seals, shaft seals and diaphragms. Conventionally, a fluorine-containing elastomer containing a vinylidene fluoride unit (VdF) has been generally applied to a technique of crosslinking reaction with peroxide (see, e.g., JP-A-53-125491) and a technique of crosslinking reaction with polyol (see, e.g. JP-B-53-4035 and JP-A-6-128334).

However, required properties become severer along with advance in technology, in the aerospace field, the semiconductor manufacturing apparatus field, the chemical plant field and the automobile industry, sealing property in a high temperature environment exceeding 200° C. has been required, and it is difficult to meet the requirement sufficiently with the conventional molded articles and the sealing materials obtained by peroxide crosslinking and polyol crosslinking.

On the other hand, for the required properties under such a high temperature environment, it has been proposed that heat resistance is tried to be improved by devising a crosslinking system. For example, using a fluorine-containing elastomer in which cyano groups are introduced as a crosslinking point, a triazine crosslinking system in which triazine rings are formed by an organic tin compound (see, e.g., JP-A-58-152041); in the same manner, using a fluorine-containing elastomer in which cyano groups are introduced as a crosslinking point, an oxazole crosslinking system in which oxazole rings are formed by a bisaminophenol; an imidazole crosslinking system in which imidazole rings are formed by a bisdiaminophenyl compound (see, e.g., JP-A-59-109546); a thiazole crosslinking system in which thiazole rings are formed by bisaminothiophenol (see, e.g. JP-A-8-104789); and a composition comprising a fluorine-containing elastomer having a carboxylic group as a crosslinking point at the terminal of the main chain and/or in a branched chain, and an oxazole crosslinking agent, an imidazole crosslinking agent or a thiazole crosslinking agent (see, e.g., WO 00/29479 pamphlet).

However, as a fluorine-containing elastomer used in Examples of each proposal, it is only a perfluoroelastomer, in a non-perfluoroelastomer containing vinylidene fluoride, there was no fluorine-containing elastomer composition obtained by carrying out the above-described oxazole crosslinking, imidazole crosslinking or thiazole crosslinking, which is excellent in compression permanent strain at high temperature.

The present invention provides a fluorine-containing elastomer composition capable of crosslinking reaction, comprising a fluorine-containing elastomer containing a vinylidene fluoride unit, which is excellent in heat resistance, and a compound containing at least two crosslinking reaction groups. Also, the present invention provides a molded article excellent in heat resistance and a sealing material for an oxygen sensors, which are obtained by crosslinking the fluorine-containing elastomer composition.

DISCLOSURE OF INVENTION

Namely, the present invention relates to a fluorine-containing elastomer composition comprising (A) at least one compound selected from the group consisting of;

a compound containing at least two crosslinking reaction groups represented by the general formula (1):

(wherein $R^1$ is the same or different, $-NH_2$, $-NHR^2$, $-OH$ or $-SH$, and $R^2$ is a fluorine atom or a monovalent organic group);

a compound represented by the general formula (2):

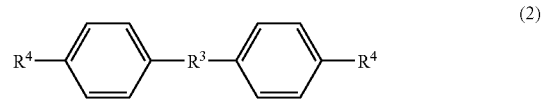

(wherein $R^3$ is $-SO_2-$, $-O-$, $-CO-$, an alkylene group having 1 to 6 carbon atoms, a perfluoroalkylene group having 1 to 10 carbon atoms, or a single bond, and $R^4$ is

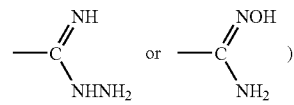

a compound represented by the general formula (3):

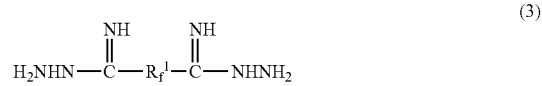

(wherein $R_f^1$ is a perfluoroalkylene group having 1 to 10 carbon atoms); and a compound represented by the general formula (4):

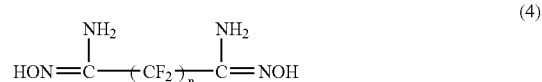

(wherein n is an integer of 1 to 10); and (B) a fluorine-containing elastomer comprising a vinylidene fluoride unit capable of a crosslinking reaction with the compound (A).

It is preferable that the fluorine-containing elastomer (B) has at least one group selected from the group consisting of a cyano group, a carboxyl group and an alkoxycarbonyl group, as a crosslinking site capable of crosslinking reaction with the compound (A).

It is preferable that the fluorine-containing elastomer (B) is a fluorine-containing elastomer containing a tetrafluoroethylene unit, a hexafluoropropylene unit and/or a perfluoro (alkyl vinyl ether) unit.

It is preferable that the compound (A) is a compound represented by the general formula (5):

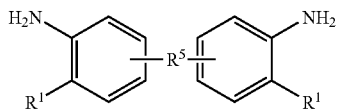

(5)

(wherein $R^1$ is the same as described above, $R^5$ is —$SO_2$—, —O—, —CO—, an alkylene group having 1 to 6 carbon atoms, a perfluoroalkylene group having 1 to 10 carbon atoms, a single bond, or a group represented by the following formula:

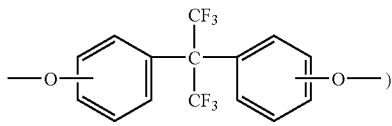

The present invention also relates to a molded article or a sealing material for an oxygen sensor, which is obtained by crosslinking the above-described fluorine-containing elastomer composition.

BEST MODE FOR CARRYING OUT THE INVENTION

The present invention relates to a fluorine-containing elastomer composition comprising (A) at least one compound selected from the group consisting of;

a compound containing at least two crosslinking reaction group s represented by the general formula (1):

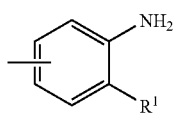

(1)

(wherein $R^1$ is the same or different, —$NH_2$, —$NHR^2$, —OH or —SH, and $R^2$ is a fluorine atom or a monovalent organic group);

a compound represented by the general formula (2):

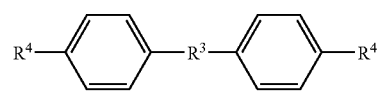

(2)

(wherein $R^3$ is —$SO_2$—, —O—, —CO—, an alkylene group having 1 to 6 carbon atoms, a perfluoroalkylene group having 1 to 10 carbon atoms, or a single bond, and $R^4$ is

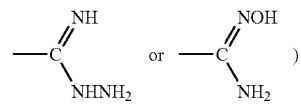

a compound represented by the general formula (3):

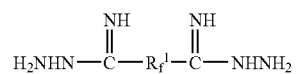

(3)

(wherein $R_f^1$ is a perfluoroalkylene group having 1 to 10 carbon atoms; and a compound represented by the general formula (4):

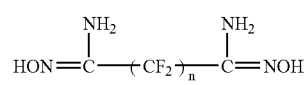

(4)

(wherein n is an integer of 1 to 10); and (B) a fluorine-containing elastomer comprising a vinylidene fluoride unit capable of a crosslinking reaction with the compound (A).

The compound (A) is at least one compound selected from the group consisting of a bisdiaminophenyl compound, a bisaminophenol compound, a bisaminothiophenol compound having at least two crosslinking reaction groups represented by the general formula (1):

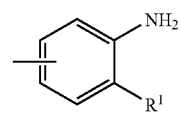

(1)

(wherein $R^1$ is the same or different, and is —$NH_2$, —$NHR^2$, —OH or —SH, and $R^2$ is a fluorine atom or a monovalent organic group); a bisamidorazone compound represented by the general formula (2):

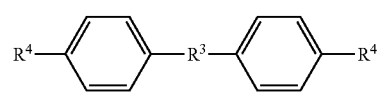

(2)

(wherein $R^3$ is —$SO_2$—, —O—, —CO—, an alkylene group having 1 to 6 carbon atoms, a perfluoroalkylene group having 1 to 10 carbon atoms or a single bond, and $R^4$ is

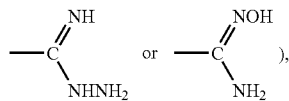

a bisamidorazone compound represented by the general formula (3):

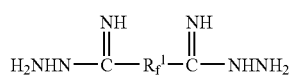

(wherein $R_f^1$ is a perfluoroalkylene group having 1 to 10 carbon atoms); and a bisamidoxime compound represented by the general formula (4):

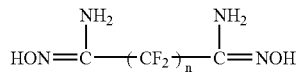

(wherein n is an integer of 1 to 10). Among these, as the compound (A), a compound having at least two crosslinking reaction groups represented by the general formula (1) is preferable.

A compound having at least two crosslinking reaction groups represented by the general formula (1) preferably has 2 to 3 crosslinking reaction groups represented by the general formula (1), and more preferably has 2 crosslinking reaction groups. When crosslinking reaction groups represented by the general formula (1) are less than 2, crosslinking cannot be carried out.

A substituent $R^2$ in a crosslinking reaction group represented by the general formula (1) is a monovalent organic group other than a hydrogen atom or a fluorine atom. A N—$R^2$ bond is preferable due to higher oxidation resistance than a N—H bond.

A monovalent organic group is not limited, but an aliphatic hydrocarbon group, a phenyl group or benzyl group is exemplified. Specifically, examples of at least one $R^2$ are a lower alkyl group having 1 to 10 carbon atoms, particularly 1 to 6 carbon atoms, such as —$CH_3$, —$C_2H_5$ and —$C_3H_7$; a fluorine-containing lower alkyl group having 1 to 10 carbon atoms, particularly 1 to 6 carbon atoms, such as —$CF_3$, —$C_2F_5$, —$CH_2F$, —$CH_2CF_3$ and —$CH_2C_2F_5$; a phenyl group; a benzyl group: a phenyl group or a benzyl group in which 1 to 5 hydrogen atoms are substituted with fluorine atoms such as —$C_6F_5$ and —$CH_2C_6F_5$; and a phenyl group or a benzyl group in which 1 to 5 hydrogen atoms are substituted with —$CF_3$ such as —$C_6H_{5-n}(CF_3)_n$ and —$CH_2C_6H_{5-n}(CF_3)_n$ (n is an integer of 1 to 5).

Among these, a phenyl group or —$CH_3$ is preferable from the viewpoint that heat resistance is particularly excellent, crosslinking reactivity is favorable, and further, synthesis is relatively easy.

From the viewpoint of the easiness in synthesis, it is preferable that the compound (A) is a compound, having two crosslinkable groups represented by the general formula (1), represented by the general formula (5):

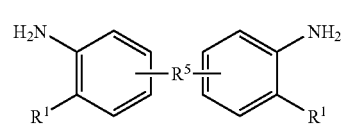

(wherein $R^1$ is the same as described above, $R^5$ is —$SO_2$—, —O—, —CO—, an alkylene group having 1 to 6 carbon atoms, a perfluoroalkylene group having 1 to 10 carbon atoms, a single bond, or a group represented by the following formula:

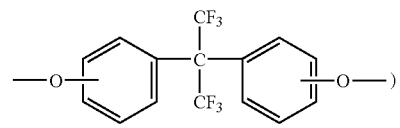

Preferable concrete examples of an alkylene group having 1 to 6 carbon atoms are a methylene group, ethylene group, propylene group, butylene group, pentylene group and hexylene group, an example of perfluoroalkylene group having 1 to 10 carbons is a group represented by the following formula:

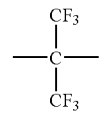

Additionally, these compounds are known as examples of bisdiaminophenyl compounds in JP-B-2-59177 and JP-A-8-120146.

A more preferable compound (A) among these is a compound represented by the general formula (6):

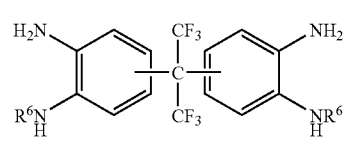

(wherein $R^6$ are the same or different, both of $R^6$ are a hydrogen atom, an alkyl group having 1 to 10 carbon atoms; a fluorine-containing alkyl group having 1 to 10 carbon atoms; a phenyl group; a benzyl group; a phenyl group or a benzyl group in which 1 to 5 hydrogen atoms are substituted with fluorine atoms and/or —$CF_3$).

Specific examples are not limited, but 2,2-bis(3,4-diaminophenyl)hexafluoropropane, 2,2-bis[3-amino-4-(N-methylamino)phenyl]hexafluoropropane, 2,2-bis[3-amino-4-(N-ethylamino)phenyl]hexafluoropropane, 2,2-bis[3-amino-4-(N-propylamino)phenyl]hexafluoropropane, 2,2-bis[3-amino-4-(N-phenylamino)phenyl]hexafluoropropane, 2,2-bis[3-amino-4-(N-perfluorophenylamino)phenyl] hexafluoropropane, and 2,2-bis[3-amino-4-(N-benzylamino) phenyl]hexafluoropropane. Among these, 2,2-bis(3,4-diaminophenyl)hexafluoropropane is further preferable from the viewpoints that heat resistance is excellent and crosslinking reactivity is particularly favorable.

These bisamidoxime crosslinking agent, bisamidorazone crosslinking agent, bisaminophenol crosslinking agent, bisaminothiophenol crosslinking agent or bisdiaminophenyl crosslinking agent reacts with the cyano group, carboxyl group or alkoxycarbonyl group contained in the fluorine-containing elastomer of the present invention to form an oxazole ring, a thiazole ring or an imidazole ring, and a crosslinked article is provided.

The compound (A) explained in the above description provides a crosslinked article excellent in mechanical strength, heat resistance, chemical resistance, low-temperature resistance, particularly excellent in heat resistance and low-temperature resistance in balance.

An amount of addition of the compound (A) is preferably 0.1 to 20 parts by weight based on 100 parts by weight of the fluorine-containing elastomer (B), and more preferably 0.5 to 10 parts by weight. When the compound (A) is less than 0.1 part by weight, it tends that practically sufficient mechanical strength, heat resistance and chemical resistance can not be obtained, and when more than 20 parts by weight, besides it takes a lot of time to crosslink, it tends that a crosslinked article becomes hard and is not flexible.

The fluorine-containing elastomer (B) is not limited, as long as it contains any compound containing a vinylidene fluoride unit, and is capable of a crosslinking reaction with the compound (A).

The fluorine-containing elastomer (B) preferably has a cyano group (—CN group), a carboxyl group (—COOH group) and an alkoxycarbonyl group (—COOR$^7$ group, wherein R$^7$ is an alkyl group having 1 to 3 carbon atoms) as a crosslinking site capable of crosslinking reaction with the compound (A). Among these, a cyano group is more preferable from the viewpoint of crosslinking reactivity. Also, a carboxyl group and an alkoxycarbonyl group are more preferable from the viewpoint of easiness in preparations, and a carboxyl group is particularly preferable.

As the fluorine-containing elastomer (B), examples are a fluororubber (a), a thermoplastic fluororubber (b), and a rubber composition comprising these fluororubbers. Among these, the fluororubber (a) is preferable.

An example of the thermoplastic fluororubber (b) is one comprising elastomeric fluorine-containing polymer chain segment and non-elastomeric fluorine-containing polymer chain segment, and a fluorine-containing multi-segmented polymer (b-1) in which at least 90% by mol of the respective structural units in elastomeric fluorine-containing polymer chain segment and non-elastomeric fluorine-containing polymer chain segment are perhaloolefin, a fluorine-containing multi-segmented polymer (b-2) in which at least 90% by mol of a structural unit in elastomeric fluorine-containing polymer chain segment is perhaloolefin and less than 90% by mol of structural unit in a non-elastomeric fluorine-containing polymer chain segment is perhaloolefin, and a fluorine-containing multi-segmented polymer (b-3) in which less than 90% by mol of a structural unit in an elastomeric fluorine-containing polymer chain segment is perhalo olefin and at least 90% by mol of a structural unit in a non-elastomeric fluorine-containing polymer chain segment is perhaloolefin, or less than 90% by mol of a structural unit in a non-elastomeric fluorine-containing polymer chain segment is perhaloolefin.

As the fluororubber (a), a VdF copolymer (I) comprising VdF and other monomers is preferable.

Specifically, as the VdF copolymer (I), repeating unit of vinylidene fluoride is preferably 40% by mol or more of and 85% by mol or less of the total number of moles of a repeating unit of vinylidene fluoride and the repeating unit derived from said other monomers in the above-described copolymer (I). A more preferable lower limit is 45% by mol, a further more preferable lower limit is 50% by mol, and a more preferable upper limit is 80% by mol.

Also, the other monomers in the above-described VdF copolymer (I) are not particularly limited as long as they can copolymerize with VdF, examples are fluorine-containing monomers such as tetrafluoroethylene (TFE), hexafluoropropylene (HFP), perfluoro(alkyl vinyl ether) (PAVE), chlorotrifluoroethylene (CTFE), trifluoroethylene, trifluoropropylene, tetrafluoropropylene, pentafluoropropylene, trifluorobutene, tetrafluoroisobutene, vinyl fluoride and an iodine-containing fluorinated vinyl ether; and non-fluorine-containing monomers such as ethylene (Et), propylene (Pr) and an alkyl vinyl ether, and from these fluorine-containing monomers and non-fluorine-containing monomers, one or at least two kinds thereof can be used in combination. The above-described PAVE can be used in combination with one or at least two kinds of compounds represented by the general formula (7):

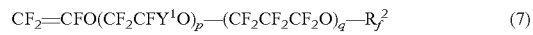

$$CF_2=CFO(CF_2CFY^1O)_p-(CF_2CF_2CF_2O)_q-R_f^2 \quad (7)$$

(wherein Y$^1$ represents a fluorine atom or —CF$_3$, R$_f^2$ represents a perfluoroalkyl group having 1 to 5 carbon atoms. p represents an integer of 0 to 5, and q represents an integer of 0 to 5). Among those represented by the general formula (7), perfluoro(methyl vinyl ether) and perfluoro(propyl vinyl ether) are preferable, and perfluoro(methyl vinyl ether) is particularly preferable.

As the above-mentioned VdF copolymer (I), from the viewpoints of compatibility with the compound (A) and low-temperature resistance, preferable are a VdF/HFP copolymer, VdF/HFP/TFE copolymer, VdF/CTFE copolymer, VdF/CTFE/TFE copolymer, VdF/PAVE copolymer, VdF/TFE/PAVE copolymer, VdF/HFP/PAVE copolymer, VdF/HFP/TFE/PAVE copolymer, VdF/TFE/Pr copolymer, or VdF/Et/HFP copolymer, and those having TFE, HFP, and/or PAVE as other monomers are preferable, particularly, a VdF/HFP copolymer, VdF/HFP/TFE copolymer, VdF/PAVE copolymer, VdF/TFE/PAVE copolymer, VdF/HFP/PAVE copolymer and VdF/HFP/TFE/PAVE copolymer are preferable.

In a VdF/HFP copolymer, a composition of VdF/HFP is preferably 45 to 85/55 to 15% by mol, more preferably 50 to 80/50 to 20% by mol, and further more preferably 60 to 80/40 to 20% by mol.

In a VdF/HFP/TFE copolymer, a composition of VdF/HFP/TFE is preferably 30 to 80/35 to 20/35 to 0% by mol.

In a VdF/PAVE copolymer, a composition of VdF/PAVE is preferably 65 to 90/10 to 35% by mol.

In a VdF/TFE/PAVE copolymer, a composition of VdF/TFE/PAVE is preferably 40 to 80/3 to 40/15 to 35% by mol In a VdF/HFP/PAVE copolymer, a composition of VdF/HFP/PAVE is preferably 65 to 90/3 to 25/3 to 25% by mol.

In a VdF/HFP/TFE/PAVE copolymer, a composition of VdF/HFP/TFE/PAVE is preferably 40 to 90/0 to 25/0 to 40/3 to 35% by mol, and more preferably 40 to 80/3 to 25/3 to 40/3 to 25% by mol.

Then, although the crosslinking site capable of a crosslinking reaction with the compound (A) may be introduced into a fluorine-containing elastomer by a polymer reaction, in addition to the above exemplified copolymers as the VdF copolymer (I), use of monomers providing crosslinking sites as other monomers is preferable from the viewpoint that easiness of its preparation. A ratio of the monomers providing crosslinking sites to a total amount of monomers structuring the VdF copolymer (I) except for the monomers providing crosslinking sites is preferably at least 0.1% by mol, more preferably at least 0.3% by mol, preferably at most 5% by mol, and more preferably at most 2% by mol.

Examples of the monomer providing crosslinking sites are an iodine-containing monomer or a bromine-containing monomer represented by the general formula (8):

$$CY^2{}_2=CY^2R_f{}^3CHR^8-X^1 \quad (8)$$

(wherein $Y^2$ is a hydrogen atom, a fluorine atom or $-CH_3$, $R_f{}^3$ is a linear or a branched fluoro or perfluoroalkylene group, which may have at least one ether oxygen atoms, or a fluoro or perfluorooxyalkylene group, or a perfluoropolyoxyalkylene group, $R^8$ is a hydrogen atom or a methyl group, and $X^1$ is an iodine atom or a bromine atom), monomers represented by the general formulas (9) to (25):

$$CY^3{}_2=CY^3(CF_2)_n-X^2 \quad (9)$$

(wherein $Y^3$ is a hydrogen atom or a fluorine atom, and n is an integer of 1 to 8);

$$CF_2=CFCF_2R_f{}^4-X^2 \quad (10)$$

(wherein $R_f{}^4$ is $-(OCF_2)_n-$ or $-(OCF(CF_3))_n-$ and n is an integer of 0 to 5);

$$CF_2=CFCF_2(OCF(CF_3)CF_2)_m(OCH_2CF_2CF_2)_nOCH_2CF_2-X^2 \quad (11)$$

(wherein m is an integer of 0 to 5, and n is an integer of 0 to 5);

$$CF_2=CFCF_2(OCH_2CF_2CF_2)_m(OCF(CF_3)CF_2)_nOCF(CF_3)-X^2 \quad (12)$$

(wherein m is an integer of 0 to 5, and n is an integer of 0 to 5);

$$CF_2=CF(OCF_2CF(CF_3))_mO(CF_2)_n-X^2 \quad (13)$$

(wherein m is an integer of 0 to 5, and n is an integer of 1 to 8);

$$CF_2=CF(OCF_2CF(CF_3))_m-X^2 \quad (14)$$

(wherein m is an integer of 1 to 5);

$$CF_2=CFOCF_2(CF(CF_3)OCF_2)_nCF(-X^2)CF_3 \quad (15)$$

(wherein n is an integer of 1 to 4);

$$CF_2=CFO(CF_2)_nOCF(CF_3)-X^2 \quad (16)$$

(wherein n is an integer of 2 to 5);

$$CF_2=CFO(CF_2)_n-(C_6H_4)-X^2 \quad (17)$$

(wherein n is an integer of 1 to 6);

$$CF_2=CF(OCF_2CF(CF_3))_nOCF_2CF(CF_3)-X^2 \quad (18)$$

(wherein n is an integer of 1 to 2);

$$CH_2=CFCF_2O(CF(CF_3)CF_2O)_nCF(CF_3)-X^2 \quad (19)$$

(wherein n is an integer of 0 to 5);

$$CF_2=CFO(CF_2CF(CF_3)O)_m(CF_2)_n-X^2 \quad (20)$$

(wherein m is an integer of 0 to 5, and n is an integer of 1 to 3);

$$CH_2=CFCF_2OCF(CF_3)OCF(CF_3)-X^2 \quad (21)$$

$$CH_2=CFCF_2OCH_2CF_2-X^2 \quad (22)$$

$$CF_2=CFO(CF_2CF(CF_3)O)_mCF_2CF(CF_3)-X^2 \quad (23)$$

(wherein m is an integer of at least zero);

$$CF_2=CFOCF(CF_3)CF_2O(CF_2)_n-X^2 \quad (24)$$

(wherein n is an integer of at least 1);

$$CF_2=CFOCF_2OCF_2CF(CF_3)OCF_2-X^2 \quad (25)$$

(in the general formulas (9) to (25), $X^2$ is a cyano group (—CN group), a carboxyl group (—COOH group) or an alkoxycarbonyl group (—COOR$^9$ group, wherein R$^9$ is an alkyl group having 1 to 10 carbon atoms, which may contain a fluorine atom), an iodine-containing monomer and a bromine-containing monomer represented by the general formula (26):

$$CH_2=CH-(CF_2)_nX^3 \quad (26)$$

(wherein n is an integer of 2 to 8, and $X^3$ is an iodine atom or a bromine atom), and these can be used alone or in an arbitrary combination thereof.

As the iodine-containing or bromine-containing monomer represented by the general formula (8), an iodine-containing fluorinated vinyl ether represented by the general formula (27):

$$I(CH_2CF_2CF_2O)_m(\overset{CF_3}{\underset{|}{C}}FCF_2O)_nCF=CF_2 \quad (27)$$

(wherein m is an integer of 1 to 5, and n is an integer of 0 to 3), is preferably exemplified, more specific examples are $ICH_2CF_2CF_2OCF=CF_2$, $I(CH_2CF_2CF_2O)_2CF=CF_2$, $I(CH_2CF_2CF_2O)_3CF=CF_2$, $ICH_2CF_2CF_2O\overset{CF_3}{\underset{|}{C}}FCF_2OCF=CF_2$, and $ICH_2CF_2CF_2O(\overset{CF_3}{\underset{|}{C}}FCF_2O)_2CF=CF_2$ Among these, $ICH_2CF_2CF_2OCF=CF_2$ is preferable.

As the iodine-containing monomer or bromine-containing monomer represented by the general formula (26), more specifically $CH_2=CHCF_2CF_2I$ is preferably exemplified.

In monomers represented by the general formulas (9) to (25), the cyano group, carboxyl group or alkoxycarbonyl group becomes a crosslinking site, and a crosslinking reaction with the compound (A) proceeds.

Further, when an iodine-containing monomer or a bromine-containing monomer represented by the general formula (8), (26) or (27) is used, in addition to the above crosslinking reaction, peroxide crosslinking can be proceeded.

The thermoplastic fluororubber (b) is explained in the following; the thermoplastic fluororubbers (b) used in the present invention contain a vinylidene fluoride (VdF) unit in an elastomeric fluorine-containing polymer chain segments and/or a non-elastomeric fluorine-containing polymer chain segments.

The fluorine-containing multi-segmented polymer (b-1) is explained below.

The elastomeric fluorine-containing polymer chain segment imparts flexibility to a polymer, and has a glass transition point of at most 25° C., and preferably at most 0° C. As a perfluoroolefin composing at least 90% by mol the structural units, and examples are tetrafluoroethylene, chlorotrifluoroethylene, hexafluoropropylene, and a perfluorovinylether represented by the general formula (28):

$$CF_2=CFO(CF_2CFY^4O)_p—(CF_2CF_2CF_2O)_q—R_f^5 \qquad (28)$$

(wherein $Y^4$ is a fluorine atom or $—CF_3$, $R_f^5$ is a perfluoroalkyl group having 1 to 5 carbon atoms, p is an integer of 0 to 5, and q is an integer of 0 to 5).

Examples of a structural unit other than perhaloolefin composing elastomeric fluorine-containing polymer chain segment are fluorine-containing monomers such as vinylidene fluoride, trifluoroethylene, trifluoropropylene, tetrafluoropropylene, pentafluoropropylene, trifluorobutene, tetrafluoroisobutene and vinyl fluoride, and non-fluorine-containing monomers such as ethylene, propylene and an alkyl vinyl ether.

A preferable example of the elastomeric fluorine-containing polymer chain segment is an elastomeric fluorine-containing polymer chain comprising tetrafluoroethylene/perfluoro(alkyl vinyl ether)/monomers providing crosslinking sites. It is preferable that a composition of tetrafluoroethylene/perfluoro(alkyl vinyl ether) is 50 to 85/50 to 15% by mol, and the monomers providing crosslinking sites are 0 to 5% by mol based on the total amount of tetrafluoroethylene and perfluoro(alkyl vinyl ether).

As the monomers providing crosslinking sites, and examples are monomers represented by the general formulas (8) through (27).

A non-elastomeric fluorine-containing polymer chain segment is explained in the following. As a perhalo olefin composing at least 90% by mol of a structural unit in the non-elastomeric fluorine-containing polymer chain segment, and examples are perhaloolefins such as tetrafluoroethylene, chlorotrifluorethylene, perfluoro(alkyl vinyl ether) hexafluoropropylene, a compound represented by the general formula (29):

$$CF_2=CF(CF_2)_r—X^4 \qquad (29)$$

(wherein r is an integer of 1 to 10, and $X^4$ is a fluorine atom or a chlorine atom), and perfluoro-2-butene.

As a structural unit other than perhaloolefin composing the non-elastomeric fluorine-containing polymer chain segment, and an example is a similar structural unit other than perhalo olefin composing the elastomeric fluorine-containing polymer chain segment.

A preferable example of the non-elastomeric fluorine-containing polymer chain segment is a non-elastomeric polymer chain comprising 85 to 100% by mol of tetrafluoroethylene and 0 to 15% by mol of a compound represented by the general formula (30):

$$CF_2=CF—R_f^6 \qquad (30)$$

(wherein $R_f^6$ is $R_f^7$ or $—OR_f^7$, $R_f^7$ is a perfluoroalkyl group having 1 to 5 carbon atoms).

A fluorine-containing multi-segmented polymer (b-2) is explained in the following.

The elastomeric fluorine-containing polymer chain segment in this case is the same one as explained regarding the above-described fluorine-containing multi-segmented polymer (b-1).

As a structural unit of the non-elastomeric fluorine-containing polymer chain segment, examples are partially fluorinated olefins such as vinylidene fluoride, vinyl fluoride, trifluoroethylene, a compound represented by the general formula (31):

$$CH_2=CY^5—(CF_2)_s—Y^5 \qquad (31)$$

(wherein $Y^5$ is hydrogen atom or fluorine atom, s is an integer of 1 to 10), and $CH_2=C(CF_3)_2$.

Also, monomers copolymerizable with these monomers such as ethylene, propylene, vinyl chloride, a vinylether, a carboxylic acid vinyl ester and acrylic acid can be used as a copolymer component.

A fluorine-containing multi-segmented polymer (b-3) is explained in the following.

The elastomeric fluorine-containing polymer chain segment in the fluorine-containing multi-segmented polymer (b-3) is a polymer chain having a glass transition point of at most 25° C., and preferably at most 0° C.

Also, the elastomeric fluorine-containing polymer chain segment contains 90% by mol or less of perhalo olefin as a structural unit. As a structural unit other than perhalo olefin in this case, an example is the same structural unit as the unit other than perhalo olefin of the above-described fluorine-containing multi-segmented polymer (b-1).

The non-elastomeric fluorine-containing polymer chain segment in the fluorine-containing multi-segmented polymer (b-3) is the same as listed in the non-elastomeric fluorine-containing polymer chain segment in the above-described fluorine-containing multi-segmented polymer (b-1) or (b-2).

A number average molecular weight of the elastomeric fluorine-containing polymer chain segment is preferably 5,000 to 750,000, and more preferably 20,000 to 400,000 from the viewpoints of imparting flexibility, elasticity and mechanical property to the obtained total fluorine-containing multi-segmented polymer.

A number average molecular weight of a non-elastomeric segment is preferably 1,000 to 1,200,000, and more preferably 3,000 to 600,000.

Also, from the point of heat resistance of the thermoplastic fluororubber (b) (fluorine-containing multi-segmented polymer), a crystalline melting point of the non-elastomeric fluorine-containing polymer chain segment is preferably at least 150° C., and more preferably 200 to 360° C.

It is important that the thermoplastic fluororubber (b) is a fluorine-containing multi-segmented polymer in which elastomeric fluorine-containing polymer chain segments and non-elastomeric fluorine-containing polymer chain segments are bonded in a form of a block or a graft. Furthermore, the thermoplastic fluororubber mainly comprises a polymer molecule in which non-elastomeric fluorine-containing polymer chain segments are bonded on both sides of elastomeric fluorine-containing polymer chain segment, and a polymer molecule in which a non-elastomeric fluorine-containing polymer chain segment is bonded on one side of an elastomeric fluorine-containing polymer chain segment.

In the present invention, a composition comprising the above-described fluororubber (a) and thermoplastic fluororubber (b) can be used.

The fluorine-containing elastomer (B) used in the present invention can be prepared by a usual process, which is polymerization processes such as emulsion polymerization, suspension polymerization and solution polymerization. Polymerization conditions such as polymerization temperature and time are suitably determined according kinds of a monomer or an intended elastomer.

As an emulsifier used in emulsion polymerization, a wide range of emulsifiers can be used, but from the viewpoint of suppressing chain transfer reaction into emulsifier molecules caused during polymerization, salts of carboxylic acid having a fluorocarbon chain or a fluoropolyether chain are preferable.

As a polymerization initiator, one capable of providing an elastomer with a carboxyl group or a group capable of generating a carboxyl group (examples are acid fluoride, acid chloride and $CF_2OH$, and all of these generate carboxyl groups in the presence of water) at its end. Specific examples are ammonium persulfate (APS) and potassium persulfate (KPS).

Also, a chain transfer agent that is generally used for adjusting a molecular weight may be used. As a chain transfer agent, examples are compounds represented by the general formulas (32) to (40):

$$I(CF_2CF_2)_nI \quad (32)$$

$$ICH_2CF_2CF_2(OCF(CF_3)CF_2)_mOCF(CF_3)-X^5 \quad (33)$$

$$ICH_2CF_2CF_2(OCH_2CF_2CF_2)_mOCH_2CF_2-X^5 \quad (34)$$

$$I(CF_2)_nX^5 \quad (35)$$

$$I(CH_2CF_2)_nX^5 \quad (36)$$

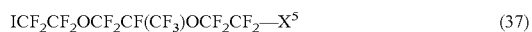
$$ICF_2CF_2OCF_2CF(CF_3)OCF_2CF_2-X^5 \quad (37)$$

$$ICH_2CF_2CF_2OCH_2CF_2-X^5 \quad (38)$$

$$ICF_2CF_2OCF_2CF_2-X^5 \quad (39)$$

$$ICF_2CF_2O(CF_2)_nOCF_2CF_2-X^5 \quad (40)$$

(wherein $X^5$ is a cyano group (—CN group), a carboxyl group (—COOH group) and an alkoxycarbonyl group (—COOR$^9$ group, $R^9$ is an alkyl group having 1 to 10 carbon atoms, which may contain a fluorine atom), m is an integer of 0 to 5, and n is an integer of at least 1. Among these, from the viewpoint of having a crosslinking site capable of reacting with the compound (A), chain transfer agents represented by the general formulas (33) to (40) are preferable.

As an isolation process of a polymerization product from a mixture of a polymerization reaction, a coagulation process by an acid treatment is preferable from the viewpoint of simplification of the process. Alternatively, a polymerization mixture may be treated with acid, thereafter, a polymerization product may be isolated by means such as freeze dry. Further, processes such as coagulation by ultrasonic wave and mechanical power can be adopted.

In the fluorine-containing elastomer (B) used in the present invention, groups such as a metal salt or an ammonium salt of carboxylic acid existing in a polymerization product can be changed to carboxyl groups by treating the polymerization product with acids. As acid treatments, for example, a process of washing with hydrochloric acid, sulfuric acid or nitric acid or a process of adjusting pH of the mixture system after polymerization to be at most 3 with these acids is preferable.

Also, carboxyl groups can be introduced by oxidizing crosslinkable elastomers containing iodine or bromine with fuming nitric acid.

Further, as an introduction process of a cyano group, a carboxyl group or an alkoxycarbonyl group, a process described in WO 00/05959 pamphlet can be used.

In the present invention, particularly in a field, which is not required high purity nor non-contaminating property, according to necessity, general additives compounded in the fluorine-containing elastomer compositions, for example, a filler, processing aid, plasticizer, colorant, stabilizer and adhesion aid can be used, and one or more kinds of commonly-used crosslinking agent and crosslinking aid different from the above-described one may be compounded.

A composition of the present invention can be prepared by mixing the above-described respective components by general processing machines for elastomers such as an open roll, a Banbury mixer and a kneader. In addition to them, it can be prepared by a process of using an internal mixer.

A process for obtaining a premolded article from the above-described composition can employ a general process, and known processes such as heat-pressing method with a mold, a process of pressing into heated mold and an extrusion process by extruder. In the case of extruded products such as a hose and an electric wire, crosslinked articles can be obtained by heat crosslinking by steam etc after extrusion.

Crosslinking conditions in the present invention are not particularly limited, crosslinking can be conducted under general crosslinking conditions for fluorine-containing elastomers. For example, in the case of conducting oxazole crosslinking, the composition is placed in a mold, maintained at 120 to 250° C. for 1 to 60 minutes under pressurization to carry out press crosslinking, then oven crosslinking is carried out by maintaining at 120 to 320° C. for 0 to 48 hours in an oven, and a crosslinked product can be obtained. Also, a combination crosslinking can be performed by adding bis(aminophenol) AF to a composition of a known crosslinking process for elastomers, for example, polyamine crosslinking, polyol crosslinking, or peroxide crosslinking.

Also, in the case of conducting imidazole crosslinking, it is most suitable for a carboxyl-containing polymer having a carboxyl group other than at the terminal, and a crosslinked product having favorable physical properties can be provided at relatively low crosslinking temperature (for example, 150 to 230° C., preferably 170 to 200° C.).

The molded article of the present invention can be obtained by crosslinking to mold the fluorine-containing elastomer composition of the present invention. The molded article of the present invention is excellent in mechanical strength, heat resistance, chemical resistance and low temperature resistance, and particularly excellent in the balance between heat resistance and low temperature resistance.

Further, a coated molded article can be also obtained by coating an elastomeric molded product with a coating material in which the fluorine-containing elastomer composition of the present invention is used, and crosslinking thereof.

As the elastomeric molded product to be coated, products prepared from various elastomer materials can be used, but particularly from the viewpoint of heat resistance, a fluorine-containing elastomer, a silicone elastomer and the like are preferably used.

The molded article of the present invention and the coated molded article are useful as various molded articles in various fields, and useful as various molded articles in the fields shown in Tables 1 to 3, and among there, useful as a sealing material, particularly a sealing material for oxygen sensors of engines in transports (such as an automobile).

TABLE 1

| Industrial field | Field | Final product | Equipment | Parts |
|---|---|---|---|---|
| Electric | Semiconductor | Semiconductor manufacturing equipment Liquid crystal panel manufacturing equipment Plasma panel manufacturing equipment | CVD equipment Dry etching equipment Wet etching equipment Oxidation and diffusion equipment Sputtering equipment Ashing equipment Cleaning equipment Ion implantation equipment | O (square) ring, packing, sealing material, tube, roll, coating, lining, gasket, diaphragm, hose |
| Transportation | Vehicle | Car | Engine and auxiliary equipment AT equipment Fuel line and auxiliary equipment | Gasket, shaft seal, valve stem seal, sealing material, hose Hose, sealing material O (square) ring, tube, packing, core material of valve, hose, sealing material, diaphragm |
| | Aircraft | Aircraft | Fuel line | Diaphragm, O (square) ring, valve, tube, packing, hose, sealing material |
| | Rocket | Rocket | Fuel line | Same as above |
| | Ship | Ship | Fuel line | Same as above |
| Chemical | Chemical products | Plant | Production line of chemicals such as pharmaceutical, agricultural chemical, coating and resin (Petroleum) | Lining, valve, packing, roll, hose, diaphragm, O (square) ring, tube, sealing material |
| Mechanical | Chemicals | Pharmaceuticals | Plug for chemicals | Plug for chemicals |
| | Photograph | Developing machine | Film developing machine | Roll |
| | | | X-ray film developing machine | Roll |
| | Printing | Printing machine | Printing roll | Roll |
| | Coating | Coating facilities | Coating roll | Roll |
| | Analyzer and physical and chemical appliances | | | Tube |
| Food | | Plant | Food processing line | Lining, valve, packing, roll, hose, diaphragm, O (square) ring, tube, sealing material |
| Metal | | Steel making | Steel sheet processing facilities | Steel sheet processing roll | Roll |

TABLE 2

| Industrial field | Basic needs |
|---|---|
| Electric | Plasma resistance, acid resistance, alkali resistance, amine resistance, ozone resistance, gas resistance, chemical resistance, cleanliness, heat resistance |
| Transportation | Heat resistance, amine resistance |
| | Heat resistance, amine resistance |
| | Fuel resistance, fuel permeability, heat resistance |
| | Fuel resistance, fuel permeability, heat resistance |
| | Fuel resistance, fuel permeability, heat resistance |
| | Fuel resistance, fuel permeability, heat resistance |
| Chemical | Chemical resistance, solvent resistance, heat resistance |
| | Chemical resistance, solvent resistance, heat resistance |
| | Cleanliness |
| Mechanical | Chemical resistance |
| | Chemical resistance |
| | Solvent resistance |
| | Solvent resistance |
| Food | Chemical resistance, solvent resistance, heat resistance |
| Metal | Heat resistance, acid resistance |

TABLE 3

| Industrial field | Specific names |
|---|---|
| Electric | O ring and sealing material for gate valve of product or equipment |
| | O ring and sealing material for quartz window of product or equipment |
| | O ring and sealing material for chamber of product or equipment |
| | O ring and sealing material for gate of product or equipment |
| | O ring and sealing material for bell jar of product or equipment |
| | O ring and sealing material for coupling of product or equipment |
| | O ring and sealing material for pump of product or equipment |
| | O ring and sealing material for gas controller for semiconductor of product or equipment |
| | O ring and sealing material for resist developing and releasing solutions |
| | O ring and sealing material for wafer cleaning solution |

TABLE 3-continued

| Industrial field | Specific names |
|---|---|
| | Diaphragm of pump for manufacturing equipment |
| | Hose for resist developing solution and releasing solution |
| | Hose and tube for wafer cleaning solution |
| | Roll for transferring wafer |
| | Lining and coating of tanks for resist developing solution and releasing solution |
| | Lining and coating of tanks for wafer cleaning solution |
| | Lining and coating of tanks for wet etching |
| Transportation | Engine head gasket |
| | Metal gasket |
| | Crank shaft seal |
| | Cam shaft seal |
| | Valve stem seal |
| | Manifold packing |
| | Oil hose |
| | ATF hose |
| | Injector O ring |
| | Injector packing |
| | O ring and diaphragm for fuel pump |
| | Fuel hose |
| Mechanics | Developing roll |
| | Developing roll |
| | Gravure roll |
| | Guide roll |
| | Gravure roll for magnetic tape production and coating line |
| | Guide roll for magnetic tape production and coating line |
| | Various coating rolls |

Also, the present invention can be favorably used for sealing materials in a semiconductor manufacturing equipment required for particularly high cleanness, in particular, a semiconductor manufacturing equipment in which irradiation of high density plasma is carried out. Examples of the sealing material are an O-ring, square ring, gasket, packing, oil-seal, bearing seal and lip seal.

Additionally, a semiconductor manufacturing equipment referred in the present invention is not particularly limited to an equipment for manufacturing particularly a semiconductor, but widely includes whole manufacturing equipments used in the semiconductor field where a high degree of cleanness is required, such as equipments for manufacturing a liquid crystal panel and a plasma panel, for example, the following equipments can be listed.

(1) Etching System
    Dry etching equipment
        Plasma etching machine
        Reactive ion etching machine
        Reactive ion beam etching machine
        Sputter etching machine
        Ion beam etching machine
    Wet etching equipment
    Ashing equipment (2) Cleaning System
    Dry etching cleaning equipment
        UV/$O_3$ cleaning machine
        Ion beam cleaning machine
        Laser beam cleaning machine
        Plasma cleaning machine
        Gas etching cleaning machine
    Extractive cleaning equipment
        Soxhlet extractive cleaning machine
        High temperature high pressure extractive cleaning machine
        Microwave extractive cleaning machine
        Supercritical extractive cleaning machine (3) Exposing System
    Stepper
    Coater and developer (4) Polishing System
    CMP equipment (5) Film Forming System
    CVD equipment
    Sputtering equipment (6) Diffusion and Ion Implantation System
    Oxidation and diffusion equipment
    Ion implantation equipment Among these, or other than these, the present invention can be suitably used for a sealing material for a semiconductor manufacturing equipment used in treatment processes operating at relatively high temperatures such as an oxidation process, diffusion process, LP-CVD process, lamp annealing process and reflow process.

The present invention is explained cased on Examples, but the present invention is not limited only thereto.

Evaluation Method

<Moony Viscosity>

The moony viscosity was measured in accordance with ASTM-D1646 and JIS K6300.

Measuring instrument: MV2000E type manufactured by ALPHA TECHNOLOGIES Ltd.

Rotor rotational number: 2 rpm.

Measuring temperature: 100° C.

<Composition Analysis>

Measurement was conducted by $^{19}$F-NMR (AC300P type manufactured by Buker Ltd.).

<Compression Permanent Strain>

According to JIS K6301, compression permanent strains of an O-ring (AS-568A-214) were measured for each after 70 hours, 168 hours, and 336 hours at 250° C.

PREPARATION EXAMPLE 1

Synthesis of COOH Group-containing Elastomer (B-1)

A stainless steel autoclave having an inner volume of 3 liters without no ignition source was charged with 1 liter of pure water and 10 g of

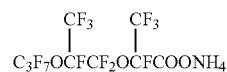

as an emulsifier, after the reaction vessel was sufficiently purged with nitrogen gas and deaerated, while stirring at 700 rpm, a temperature was raised to 80° C., a mixed gas of vinylidene fluoride (VdF) and hexafluoropropylene (HFP) (VdF/HFP=50/50 by molar ratio) was charged thereto to be an inner pressure of 1.52 MPa·G. Then, 4 ml of an aqueous solution of ammonium persulfate (APS) having a concentration of 4.35 mg/ml was pressed in with a nitrogen pressure to initiate a reaction.

At the point that the inner pressure decreased to 1.48 MPa·G by polymerization proceeding, 0.617 g of I(CF$_2$CF$_2$)$_2$I was pressed in by the nitrogen pressure. Then, a mixed gas of VdF/HFP (78/22 by weight ratio) was pressed in respectively with their own pressures so that the pressure is 15.2 MPa·G. After that, as the reaction proceeded, VdF and HFP were pressed in in the same manner, and while repeating pressurization and depressurization from 14.8 to 15.2 MPa·G, 11.8 g of $CF_2=CFOCF_2CF(CF_3)OCF_2CF_2COOH$ (CBVE) was pressed in with the nitrogen pressure.

After 16 hours from initiation of the polymerization reaction, at the point that the total charged amount of VdF and HFP reached 200 g, the autoclave was cooled, and unreacted monomers were released to obtain 1,539 g of an aqueous dispersion having a solid content concentration of 13.9% by weight.

1,200 g out of this aqueous dispersion was diluted with 1,200 g of water, the resultant was slowly added to 1,200 g of a 3.5% by weight-hydrochloric acid aqueous solution while stirring. After stirring for 30 minutes after adding, a coagulated article was collected by filtration, the obtained polymer was further placed in 2 kg of HCFC-141b, stirred for 5 minutes, and separated by filtration again. Then, after repeating operations of washing with water and filtering 4 times, the resultant was dried in vacuum at 100° C. for 12 hours, thereby to obtain 155 g of a polymer (crosslinkable fluorine-containing elastomer (B-1)).

As the results of analysis, the monomer unit composition of this polymer was VdF/HFP/CBVE=74.9/24.0/1.1% by mol. Also from the measurement of infrared spectroscopy, it was recognized that characteristic absorption of a carboxyl group was near at 1,773 $cm^{-1}$, and characteristic absorption of an OH group was near at 3,538 $cm^{-1}$ and 3,090 $cm^{-1}$. Moony viscosity at 100° C. of this fluorine-containing elastomer was 82.

PREPARATION EXAMPLE 2

Synthesis of COOH Group-Containing Elastomer (B-2)

A stainless steel autoclave having an inner volume of 3 liters without no ignition source was charged with 1.2 liter of pure water and 2.4 g of $C_7H_{15}COONH_4$ as an emulsifier, after the reaction vessel was sufficiently purged with nitrogen gas and deaerated, while stirring at 700 rpm, a temperature was raised to 80° C., a mixed gas of vinylidene fluoride (VdF) and hexafluoropropylene (HFP) (VdF/HFP=50/50 by molar ratio) was charged thereto to be an inner pressure of 1.52 MPa·G. Then, 4 ml of an aqueous solution of ammonium persulfate (APS) having a concentration of 4.35 mg/ml was pressed in with a nitrogen pressure to initiate a reaction.

At the point that the inner pressure decreased to 1.48 MPa·G by polymerization proceeding, 0.340 g of $ICH_2CF_2COOCH_3$ was pressed in by the nitrogen pressure. Then, a mixed gas of VdF/HFP (78/22 by weight ratio) was pressed in respectively with their own pressures so that the pressure is 15.2 MPa·G. After that, as the reaction proceeded, VdF and HFP were pressed in in the same manner, and while repeating pressurization and depressurization from 14.8 to 15.2 MPa·G, 11.8 g of $CF_2=CFOCF_2CF(CF_3)OCF_2CF_2COOH$ (CBVE) was pressed in with the nitrogen pressure.

After 16 hours from initiation of the polymerization reaction, at the point that the total charged amount of VdF and HFP reached 200 g, the autoclave was cooled, and unreacted monomers were released to obtain 1,487 g of an aqueous dispersion having a solid content concentration of 14.6% by weight.

1,200 g out of this aqueous dispersion was diluted with 1,200 g of water, the resultant was slowly added to 1,200 g of a 3.5% by weight-hydrochloric acid aqueous solution while stirring. After stirring for 30 minutes after adding, a coagulated article was collected by filtration, the obtained polymer was further placed in 2 kg of HCFC-141b, stirred for 5 minutes, and separated by filtration again. Then, after repeating operations of washing with water and filtering 4 times, the resultant was dried in vacuum at 100° C. for 12 hours, thereby to obtain 170 g of a polymer (crosslinkable fluorine-containing elastomer (B-2)).

As the results of analysis, the monomer unit composition of this polymer was VdF/HFP/CBVE=75.6/23.3/1.1% by mol. Also from the measurement of infrared spectroscopy, it was recognized that characteristic absorption of a carboxyl group was near at 1,773 $cm^{-1}$, and characteristic absorption of an OH group was near at 3,538 $cm^{-1}$ and 3,090 $cm^{-1}$. Moony viscosity at 100° C. of this fluorine-containing elastomer was 170.

PREPARATION EXAMPLE 3

Synthesis of COOH Group-Containing Elastomer (B-3)

A stainless steel autoclave having an inner volume of 3 liters without no ignition source was charged with 1.5 liter of pure water and 3.0 g of $C_7F_{15}COONH_4$ as an emulsifier, after the reaction vessel was sufficiently purged with nitrogen gas and deaerated, while stirring at 700 rpm, a temperature was raised to 80° C., a mixed gas of vinylidene fluoride (VdF) and hexafluoropropylene (HFP) (VdF/HFP=50/50 by molar ratio) was charged thereto to be an inner pressure of 1.52 MPa·G. Then, 4 ml of an aqueous solution of ammonium persulfate (APS) having a concentration of 7.5 mg/ml was pressed in with a nitrogen pressure to initiate a reaction.

At the point that the inner pressure decreased to 1.48 MPa·G by polymerization proceeding, 0.575 g of $ICF_2CF_2CF_2COOH$ was pressed in by the nitrogen pressure. Then, a mixed gas of VdF/HFP (78/22 by weight ratio) was pressed in respectively with their own pressures so that the pressure is 15.2 MPa·G. After that, as the reaction proceeded, VdF and HFP were pressed in in the same manner, and while repeating pressurization and depressurization from 14.8 to 15.2 MPa·G, 14.1 g of $CF_2=CFOCF_2CF(CF_3)OCF_2CF_2COOH$ (CBVE) was pressed in with the nitrogen pressure.

After 8 hours from initiation of the polymerization reaction, at the point that the total charged amount of VdF and HFP reached 250 g, the autoclave was cooled, and unreacted monomers were released to obtain 1,830 g of an aqueous dispersion having a solid content concentration of 14.4% by weight.

1,200 g out of this aqueous dispersion was diluted with 1,200 g of water, the resultant was slowly added to 1,200 g of a 3.5% by weight-hydrochloric acid aqueous solution while stirring. After stirring for 30 minutes after adding, a coagulated article was collected by filtration, the obtained polymer was further placed in 2 kg of HCFC-141b, stirred for 5 minutes, and separated by filtration again. Then, after repeating operations of washing with water and filtering 4 times, the resultant was dried in vacuum at 100° C. for 12 hours, thereby to obtain 170 g of a polymer (crosslinkable fluorine-containing elastomer (B-3)).

As the results of analysis, the monomer unit composition of this polymer was VdF/HFP/CBVE=75.9/23.2/0.9% by mol. Also from the measurement of infrared spectroscopy, it was recognized that characteristic absorption of a carboxyl group was near at 1,773 $cm^{-1}$, and characteristic absorption of an OH group was near at 3,538 cm$^{-1}$ and 3,090 cm$^{-1}$. Moony viscosity at 100° C. of this fluorine-containing elastomer was 152.

PREPARATION EXAMPLE 4

Synthesis of CN Group-Containing Elastomer (B-4)

A stainless steel autoclave having an inner volume of 3 liters without no ignition source was charged with 1 liter of pure water and 2.2 g of $C_7F_{15}COONH_4$ as an emulsifier, after the reaction vessel was sufficiently purged with nitrogen gas and deaerated, while stirring at 700 rpm, a temperature was raised to 70° C., a mixed gas of vinylidene fluoride (VdF) and hexafluoropropylene (HFP) (VdF/HFP=50/50 by molar ratio) was charged thereto to be an inner pressure of 1.52 MPa·G. Then, 3 ml of aqueous solution of an ammonium persulfate (APS) having a concentration of 15 mg/ml was pressed in with a nitrogen pressure to initiate a reaction.

Then, a mixed gas of VdF/HFP (78/22 by weight ratio) was pressed in respectively with their own pressures so that the pressure is 15.2 MPa·G. After that, as the reaction proceeded, VdF and HFP were pressed in in the same manner, and while repeating pressurization and depressurization from 14.8 to 15.2 MPa·G, 9.97 g of $CF_2$=$CFOCF_2CF(CF_3)OCF_2CF_2CN$ (CNVE) was pressed in with the nitrogen pressure.

After 8.5 hours from initiation of the polymerization reaction, at the point that the total charged amount of VdF and HFP reached 124 g, the autoclave was cooled, and unreacted monomers were released to obtain 1,646 g of an aqueous dispersion having a solid content concentration of 8.1% by weight.

1,600 g out of this aqueous dispersion was slowly added to 1,600 g of a 3.5% by weight-hydrochloric acid aqueous solution while stirring. After stirring for 30 minutes after adding, a coagulated article was collected by filtration. The coagulated article was dried in vacuum at 70° C. for 48 hours, thereby to obtain 122 g of a polymer (crosslinkable fluorine-containing elastomer (B-4)).

As the results of analysis, the monomer unit composition of this polymer was VdF/HFP/CNVE=74.9/24.3/0.8% by mol. Also from the measurement of infrared spectroscopy, it was recognized that characteristic absorption of a cyano group was near at 2,169 cm$^{-1}$. Moony viscosity at 171° C. of this fluorine-containing elastomer was 105.

EXAMPLE 1

2,2-bis(3,4-diaminophenyl)hexafluoropropane (crosslinking agent TA-AF) as a compound (A) of a crosslinking agent, and carbon black (MT-C available from Cancarb Ltd.) as a filler were mixed into the crosslinkable fluorine-containing elastomer (B-1) obtained in Preparation Example 1 in the weight ratio of 100/2.2/20, and the mixture was kneaded in an open roll to prepare a crosslinkable fluorine-containing elastomer composition.

Then, after the crosslinkable composition was crosslinked by pressing at 180° C. for 90 minutes, further, oven crosslinking was carried out in an oven sequentially at 200° C. for 2 hours, at 260° C. for 5 hours, at 300° C. for 2 hours, thereby to prepare a crosslinked article having 2 mm thickness and an O-ring (AS-568A-214) as a sample being tested. The compression permanent strain of the crosslinked article was measured. The results are shown in Table 4.

EXAMPLE 2

2,2-bis(3,4-diaminophenyl)hexafluoropropane (crosslinking agent TA-AF) as a compound (A) of crosslinking agent and carbon black (MT-C, manufactured by Cancarb Ltd.) as a filler were mixed into the crosslinkable fluorine-containing elastomer (B-2) obtained in Preparation Example 2 in the weight ratio of 100/2.8/20, and the mixture was kneaded in an open roll to prepare a crosslinkable fluorine-containing elastomer composition.

Then, after the crosslinkable composition was crosslinked by pressing at 180° C. for 90 minutes, further, oven crosslinking was carried out in an oven sequentially at 200° C. for 2 hours, at 260° C. for 5 hours, at 300° C. for 2 hours, thereby to prepare a crosslinked article having 2 mm thickness and an O-ring (AS-568A-214) as a sample being tested. The compression permanent strain of the crosslinked article was measured. The results are shown in Table 4.

EXAMPLE 3

2,2-bis(3,4-diaminophenyl)hexafluoropropane (crosslinking agent TA-AF) as a compound (A) of crosslinking agent, and carbon black (MT-C, manufactured by Cancarb Ltd.) as a filler were mixed into the crosslinkable fluorine-containing elastomer (B-3) obtained in Preparation Example 3 in the weight ratio of 100/2.8/20, and the mixture was kneaded in an open roll to prepare a crosslinkable fluorine-containing elastomer composition.

Then, after the crosslinkable composition was crosslinked by pressing at 180° C. for 90 minutes, further, oven crosslinking was carried out in an oven sequentially at 200° C. for 2 hours, at 260° C. for 5 hours, at 300° C. for 2 hours, thereby to prepare a crosslinked article having 2 mm thickness and an O-ring (AS-568A-214) as a sample being tested. The compression permanent strain of the crosslinked article was measured. The results are shown in Table 4.

EXAMPLE 4

2,2-bis(3,4-diaminophenyl)hexafluoropropane (crosslinking agent TA-AF) as a compound (A) of crosslinking agent, and carbon black (MT-C, manufactured by Cancarb Ltd.) as a filler were mixed into the crosslinkable fluorine-containing elastomer (B-4) obtained in Preparation Example 4 in the weight ratio of 100/1.7/20 by weight, and the mixture was kneaded in an open roll to prepare a crosslinkable fluorine-containing elastomer composition.

Then, after the crosslinkable composition was crosslinked by pressing at 200° C. for 60 minutes, further, oven crosslinking was carried out in an oven sequentially at 200° C. for 2 hours, at 260° C. for 5 hours, at 300° C. for 2 hours, thereby to prepare a crosslinked article having 2 mm thickness and an O-ring (AS-568A-214) as a sample being tested. The compression permanent strain of the crosslinked article was measured. The results are shown in Table 4.

COMPARATIVE EXAMPLE 1

A generally commercially available fluorine-containing elastomer (a fluorine-containing elastomer comprising vinylidene fluoride/hexafluoropropylene=78/22), carbon black (MT-C available from Cancarb Ltd.), an acid accepter (Caldic #2000 available from Kyowa Chemical Industry Co., Ltd.), and magnesium oxide (MA-150 available from Kyowa Chemical Industry Co., Ltd.) were mixed in the weight ratio of 100/20/6/3, and the mixture was kneaded in an open roll to prepare a crosslinkable fluorine-containing elastomer composition.

Then, after the crosslinkable composition was pressed at 170° C. for 10 minutes, further, oven crosslinking was carried out in an oven at 230° C. for 24 hours, thereby to prepare a crosslinked article having 2 mm thickness and an O-ring (AS-568A-214) as a sample being tested. The compression permanent strain of the crosslinked product was measured. The results are shown in Table 4.

TABLE 4

|  | Ex. 1 | Ex. 2 | Ex. 3 | Ex. 4 | Com. Ex. 1 |
|---|---|---|---|---|---|
| Composition |  |  |  |  |  |
| Crosslinkable fluorine-containing elastomer (B-1) | 100 |  |  |  |  |
| Crosslinkable fluorine-containing elastomer (B-2) |  | 100 |  |  |  |
| Crosslinkable fluorine-containing elastomer (B-3) |  |  | 100 |  |  |
| Crosslinkable fluorine-containing elastomer (B-4) |  |  |  | 100 |  |
| Fluorine-containing elastomer |  |  |  |  | 100 |
| MT carbon | 20 | 20 | 20 | 20 | 20 |
| Caldic #2000 |  |  |  |  | 6 |
| MA-150 |  |  |  |  | 3 |
| Crosslinking agent TA-TF | 2.2 | 2.8 | 2.8 | 1.7 |  |
| Compression permanent strain (%) |  |  |  |  |  |
| 250° C. for 70 hours | 41 | 39 | 34 | 39 | 38 |
| 250° C. for 168 hours | 58 | 55 | 52 | 67 | 62 |
| 250° C. for 336 hours | 75 | 74 | 74 | 89 | 86 |

INDUSTRIAL APPLICABILITY

The fluorine-containing elastomer composition of the present invention is excellent in heat resistance due to comprising a fluorine-containing elastomer containing a vinylidene fluoride unit, which is capable of a crosslinking reaction, and a crosslinking agent, and can also provide a molded article and a sealing material for an oxygen sensor, which are excellent in heat resistance.

The invention claimed is:

1. A fluorine-containing elastomer composition comprising (A) at least one compound selected from the group consisting of:

a compound containing at least two crosslinking reaction groups represented by the general formula (1):

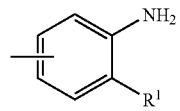

(wherein $R^1$ is the same or different, —$NH_2$, —$NHR^2$, —OH or —SH, and $R^2$ is a fluorine atom or a monovalent organic group);

a compound represented by the general formula (2):

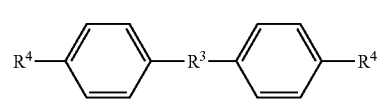

(wherein $R^3$ is —$SO_2$—, —O—, —CO—, an alkylene group having 1 to 6 carbon atoms, a perfluoroalkylene group having 1 to 10 carbon atoms, or a single bond, and $R^4$ is

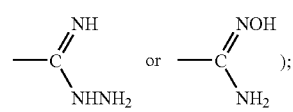

a compound represented by the general formula (3):

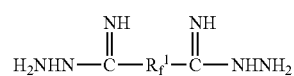

(wherein $R_f^1$ is a perfluoroalkylene group having 1 to 10 carbon atoms); and a compound represented by the general formula (4):

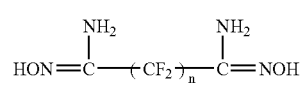

(wherein n is an integer of 1 to 10), and (B) a fluorine-containing elastomer capable of a crosslinking reaction with the compound (A), said fluorine-containing elastomer (B) is one selected from the group consisting of a copolymer of 50 to 80% by mol of vinylidene fluoride and 50 to 20% by mol of hexafluoropropylene, a copolymer of 30 to 80% by mol of vinylidene fluoride, 35 to 20% by mol of hexafluoropropylene and 35 to 0% by mol of tetrafluoroethylene and a copolymer of 40 to 80% by mol of vinylidene fluoride, 3 to 40% by mol of tetrafluoroethylene and 15 to 35% by mol of perfluoro(alkyl vinyl ether), said fluorine-containing elastomer (B) has a monomer which gives a crosslinking site capable of a crosslinking reaction with the compound (A) in an amount of 0.3 to 2.0 % by mol.

2. The fluorine-containing elastomer composition of claim 1, wherein the fluorine-containing elastomer (B) has at least one group selected from the group consisting of a cyano group, a carboxyl group and an alkoxycarbonyl group as a crosslinking site capable of a crosslinking reaction with the compound (A).

3. The fluorine-containing elastomer composition of claim 1, wherein the compound (A) is a compound represented by the general formula (5):

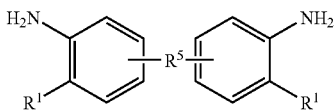

(5)

wherein $R^1$ is the same as described above, $R^5$ is —$SO_2$—, —O—, —CO—, an alkylene group having 1 to 6 carbon atoms, a perfluoroalkylene group having 1 to 10 carbon atoms, a single bond, or a group represented by the following formula:

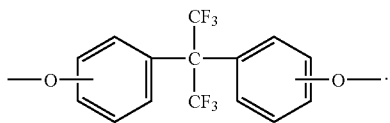

4. The fluorine-containing elastomer composition of claim 2, wherein the compound (A) is a compound represented by the general formula (5):

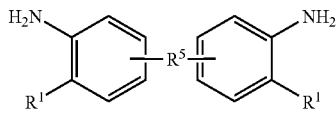

(5)

wherein $R^1$ is the same as described above, $R^5$ is —$SO_2$—, —O—, —CO—, an alkylene group having 1 to 6 carbon atoms, a perfluoroalkylene group having 1 to 10 carbon atoms, a single bond, or a group represented by the following formula:

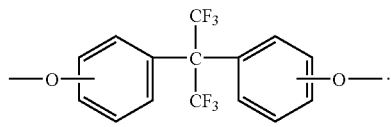

5. A molded article, which is obtained by crosslinking the fluorine-containing elastomer composition of claim 1.

6. A molded article, which is obtained by crosslinking the fluorine-containing elastomer composition of claim 2.

7. A molded article, which is obtained by crosslinking the fluorine-containing elastomer composition of claim 3.

8. A molded article, which is obtained by crosslinking the fluorine-containing elastomer composition of claim 4.

9. A sealing material for an oxygen sensor, which is obtained by crosslinking the fluorine-containing elastomer composition of claim 1.

10. A sealing material for an oxygen sensor, which is obtained by crosslinking the fluorine-containing elastomer composition of claim 2.

11. A sealing material for an oxygen sensor, which is obtained by crosslinking the fluorine-containing elastomer composition of claim 3.

\* \* \* \* \*